United States Patent
Sperrhacke et al.

(10) Patent No.: US 10,337,365 B2
(45) Date of Patent: Jul. 2, 2019

(54) CONTROL SHAFT FOR INLET VALVE SHUT-OFF

(71) Applicant: Bayerische Motoren Werke Aktiengesellschaft, Munich (DE)

(72) Inventors: Sebastian Sperrhacke, Munich (DE); Ferdinand Weidinger, Geretsried (DE); Alexander Hiereth, Munich (DE); Timo Klees, Hebertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/884,662

(22) Filed: Jan. 31, 2018

(65) Prior Publication Data
US 2018/0149049 A1 May 31, 2018

Related U.S. Application Data

(63) Continuation of application No. PCT/EP2016/073885, filed on Oct. 6, 2016.

(30) Foreign Application Priority Data

Oct. 14, 2015 (DE) .......................... 10 2015 219 875

(51) Int. Cl.
*F01L 1/34* (2006.01)
*F01L 13/00* (2006.01)
(Continued)

(52) U.S. Cl.
CPC .......... *F01L 13/0005* (2013.01); *F01L 1/053* (2013.01); *F01L 1/185* (2013.01); *F01L 1/462* (2013.01);
(Continued)

(58) Field of Classification Search
CPC ....... F01L 13/0005; F01L 1/185; F01L 1/462; F01L 1/053; F01L 1/08; F01L 1/2405;
(Continued)

(56) References Cited

U.S. PATENT DOCUMENTS

| 2005/0022762 | A1 | 2/2005 | Machida |
| 2008/0078345 | A1* | 4/2008 | Knauf ................. F01L 13/0021 123/90.17 |

(Continued)

FOREIGN PATENT DOCUMENTS

| DE | 10 2004 031 166 A1 | 1/2005 |
| DE | 10 2005 040 959 A1 | 3/2007 |

(Continued)

OTHER PUBLICATIONS

International Search Report (PCT/ISA/210) issued in PCT Application No. PCT/EP2016/073885 dated Jan. 23, 2017 with English translation (Four (4) pages).

(Continued)

*Primary Examiner* — Zelalem Eshete
(74) *Attorney, Agent, or Firm* — Crowell & Moring LLP

(57) ABSTRACT

A control shaft of a cam shaft adjustment unit has axially spaced adjustment cams, which are designed in a first axial section of the control shaft for a continuous operation of a cylinder and in a second axial section for a cylinder shut-off. The adjustment cams for the continuous operation of a cylinder have, over the entire circumference of the cam circle, a radial extension which is greater than a zero stroke extension and the adjustment cams for the cylinder shut-off have, around their circumference, a shut-off section of the cam circle with a radial extension which is less than or equal to the zero stroke extension. The control shaft has a stop that (Continued)

reduces the rotation in both circumferential directions and functions as the calibration point for an engine electronics system.

12 Claims, 2 Drawing Sheets

(51) Int. Cl.
| | | |
|---|---|---|
| *F02D 41/24* | (2006.01) |
| *F01L 1/053* | (2006.01) |
| *F02D 13/06* | (2006.01) |
| *F01L 1/18* | (2006.01) |
| *F01L 1/46* | (2006.01) |
| *F02B 75/20* | (2006.01) |
| *F02D 41/00* | (2006.01) |
| *F01L 1/08* | (2006.01) |
| *F02B 75/18* | (2006.01) |
| *F01L 1/24* | (2006.01) |

(52) U.S. Cl.
CPC .......... *F01L 13/0063* (2013.01); *F02B 75/20* (2013.01); *F02D 13/06* (2013.01); *F02D 41/2432* (2013.01); *F01L 1/08* (2013.01); *F01L 1/2405* (2013.01); *F01L 2013/001* (2013.01); *F01L 2013/0068* (2013.01); *F01L 2105/00* (2013.01); *F01L 2201/00* (2013.01); *F01L 2820/01* (2013.01); *F02B 2075/1824* (2013.01); *F02D 41/0087* (2013.01); *F02D 2041/0012* (2013.01); *Y02T 10/18* (2013.01)

(58) Field of Classification Search
CPC ............. F01L 2201/00; F01L 2013/001; F01L 2105/00; F01L 2820/01; F02D 41/2432; F02D 41/0087; F02D 13/06; F02D 2041/0012; F02B 75/20; F02B 2075/1824; Y02T 10/18
See application file for complete search history.

(56) References Cited

U.S. PATENT DOCUMENTS

| | | |
|---|---|---|
| 2013/0199472 A1 | 8/2013 | Flierl |
| 2015/0047586 A1 | 2/2015 | Nowak et al. |

FOREIGN PATENT DOCUMENTS

| | | |
|---|---|---|
| DE | 10 2006 033 559 A1 | 1/2008 |
| DE | 10 2010 048 709 A1 | 4/2012 |
| DE | 10 2012 002 026 A1 | 8/2013 |
| DE | 10 2012 006 983 A1 | 10/2013 |
| DE | 20 2014 104 157 U1 | 10/2014 |

OTHER PUBLICATIONS

German-language Written Opinion (PCT/ISA/237) issued in PCT Application No. PCT/EP2016/073885 dated Jan. 23, 2017 (Seven (7) pages).

German-language Search Report issued in counterpart German Application No. 10 2015 219 875.8 dated Aug. 25, 2016 with partial English translation (Twelve (12) pages).

* cited by examiner

CONTROL SHAFT FOR INLET VALVE SHUT-OFF

CROSS REFERENCE TO RELATED APPLICATIONS

This application is a continuation of PCT International Application No. PCT/EP2016/073885, filed Oct. 6, 2016, which claims priority under 35 U.S.C. § 119 from German Patent Application No. 10 2015 219 875.8, filed Oct. 14, 2015, the entire disclosures of which are herein expressly incorporated by reference.

BACKGROUND AND SUMMARY OF THE INVENTION

The invention relates to a control shaft of the camshaft adjusting unit for inlet valve shut-off in an internal combustion engine having adjusting cams which are spaced apart axially, and to the camshaft adjusting unit.

The inlet valve shut-off is a variant of a cylinder shut-off in internal combustion engines for reducing the fuel consumption. By means of deactivation of the inlet and outlet valves in combination with an interruption of the fuel supply, half of the cylinders are shut off, and the operating point of the engine is therefore shifted into a range of an improved degree of efficiency on account of the mean pressure increase.

In addition to mechanical solutions having more than one crankshaft, solutions for cylinder shut-off are also known from the prior art, for example, in which solutions the fuel injection and mixture ignition are enabled or shut off in a controlled manner.

A possible valve lift adjustment is also known from the prior art, which valve lift adjustment makes a continuous adjustment of the valve lift possible from minimum lifts as far as the maximum lift in a manner which is dependent on the respective load requirement of the internal combustion engine. In the known variable valve control systems, the cams of the camshaft act on an intermediate lever which opens and closes the inlet valves indirectly or directly. The intermediate lever is moved via a control shaft and, in particular, via adjusting cams which are configured on the control shaft in different operating positions, and the intermediate lever is pulled into an original position via a restoring spring. Depending on the operating position of the control shaft, the cams of the camshaft have a greater or lesser action on the intermediate lever and therefore adjust the valve lift which is achieved.

Building on what is known, the invention is based on the object of providing a cylinder shut-off via a special valve lift control, in particular a specially shaped control shaft for controlling the camshaft action.

This and other objects are achieved in accordance with embodiments of the invention.

According to the invention, a control shaft of a camshaft adjusting unit for an internal combustion engine is provided having adjusting cams which are spaced apart axially and are configured in a first axial section of the control shaft for continuous cylinder operation and in a second axial section for a cylinder shut-off. The adjusting cams for the continuous cylinder operation have a radial extent which is greater than a zero lift extent over their entire circumference of the cam circle. The adjusting cams for the cylinder shut-off have, in the circumferential direction, a shut-off section of the cam circle with a radial extent which is smaller than or equal to the zero lift extent. The control shaft has a stop which limits the rotation in both circumferential directions and serves as a calibration point for an engine electronics system. The system can therefore be recalibrated in the case of implausible values in the engine electronics system. The zero lift extent is defined as the radial extent of the adjusting cams as far as the base circle of the control shaft. In the case of a zero lift extent, the respective adjusting cam in the corresponding section exhibits no mechanical effect on other components and therefore prevents a valve lift.

An adjusting range of 30° of adjusting cam is left free for the mechanical stop, with the result that the adjusting range of the control shaft lies at 330°. In one possible embodiment, the stop is integrated into the bearing system of the control shaft. A pin can additionally be arranged on the control shaft, which pin comes into contact in the respective end positions with a lug which is seated on the bearing system, for example the bearing bracket.

In one advantageous embodiment, the mechanical stop is configured by way of two mechanical end stops which limit both rotational directions of the control shaft.

According to the invention, the cylinder shut-off is brought about by way of differently shaped adjusting cams on the control shaft, which control cams are configured in the case of the cylinders which are not to be shut off in such a way that opening of the inlet valves takes place in every position of the control shaft, and are configured in the case of the cylinders to be shut off in such a way that opening of the inlet valves (no shut-off) takes place in one position and no opening of the inlet valves takes place in a predefined shut-off position (shut-off). Cylinder filling and fuel injection do not take place in the case of inlet valves which are not open.

In one preferred embodiment, the control shaft for a straight six cylinder internal combustion engine is configured with, in each case, one adjusting cam per inlet valve, it being possible for three outer cylinders to be switched off, and the correspondingly associated adjusting cams being configured accordingly with a shut-off section with a radial extent as far as at most the base circle.

It is provided in one design variant in the case of the control shaft that it has a rotational adjusting range in the circumferential direction (in the cam circle) of from 330 to 360°. In the case of a 360° adjustability, the adjusting cams for the cylinder shut-off favorably have a radial extent which is consistently greater than a zero lift extent over the first 180° in the circumferential direction, and a radial extent which is consistently smaller than or equal to the zero lift extent over the second 180° in the circumferential direction. An extent smaller than the zero lift extent is to be considered as an exception, however, since the diameter of the control shaft is reduced greatly in the region of the adjusting cams as a result. The shape in the circumferential direction in the cam circle in the case of the adjusting cams for the cylinder shut-off is accordingly provided as a split in the circumferential direction. By way of the adjustment of the control shaft, the adjusting cams for the cylinder shut-off can be moved into a position, in which they exhibit no effect toward the outside on other components and the inlet valves remain closed. At the same time, the adjusting cams for the continuous cylinder operation take effect on account of their different shape and make the opening of the inlet valves possible. As a result of the axial split of the control shaft with partially provided adjusting cams for the continuous cylinder operation and adjusting cams for the cylinder switch-off, operation with all cylinders or only part of the cylinders is made possible depending on the control shaft rotational position.

The different positions of the control shaft are realized via an actuating motor. As a result of the split form of the adjusting cams for the cylinder shut-off, a rise in the torque occurs at the actuating motor. Said torque rise can be reduced by way of a special configuration of the adjusting cams for the continuous cylinder operation. For this purpose, it is provided in one variant of the invention that the adjusting cams for the continuous cylinder operation have a radial extent which is smaller than a maximum lift extent in a section of the cam circle, which section corresponds to the shut-off section of the adjusting cams for the cylinder shut-off. As a consequence, maximum valve lifts are not achieved during operation with partially shut-off cylinders. Said maximum valve lifts are scarcely required in any case in said operating phase, however.

The control shaft is distinguished by the fact that it can be set into at least two operating positions by way of rotation, the first operating position ensuring continuous cylinder operation in the case of all adjusting cams, and the second operating position ensuring partial cylinder shut-off at the adjusting cams for the cylinder shut-off and continuous cylinder operation in the case of the adjusting cams for the continuous cylinder operation.

In order to make the phasing operation which is known from the prior art possible, it is provided in one advantageous embodiment that two adjusting cams are provided on the control shaft per cylinder of the internal combustion engine. The geometry and arrangement in the circumferential direction of the adjusting cams on the control shaft can be adapted individually, in order to ensure a dedicated opening characteristic for each inlet valve of each cylinder.

Furthermore, the invention relates to a camshaft adjusting unit for an internal combustion engine having a camshaft with a plurality of cams which are spaced apart axially, a plurality of transmission devices which are configured to transmit a camshaft rotation and action of the cams into a translational movement to engine inlet valves which belong in each case to the transmission devices, in order to open and to close said engine inlet valves. It is possible for a position of the transmission devices and therefore their action on the inlet valves to be adapted by way of an above-described control shaft, by their adjusting cams acting on in each case one transmission device, the adjusting cams for the cylinder shut-off in the shut-off section of the cam circle being without action on the transmission device. The result is that said transmission devices do not bring about opening of the inlet valves in the case of being loaded by way of the cams of the camshaft, the control shaft having a stop which limits the rotation in both circumferential directions and serves as a calibration point for an engine electronics system. All of the features which are described above for the control shaft can be applied and are valid directly for the camshaft adjusting unit.

The invention also includes the corresponding method for shutting off inlet valves in an engine using the described camshaft adjusting unit, the position of the transmission devices and therefore their effect on the inlet valves being adapted by virtue of the fact that their adjusting cams act on in each case one transmission device, the adjusting cams for the cylinder shut-off in the shut-off section in the cam circle being without action on the transmission device. The result is that said transmission devices do not bring about opening of the inlet valves in the case of being loaded by way of the cams of the camshaft.

The invention is particularly advantageous for a straight six cylinder internal combustion engine, in which three of the six cylinders are to be shut off. A straight six cylinder internal combustion engine according to the invention includes the above-described camshaft adjusting unit, and is distinguished by the fact that three of the six cylinders can be shut off by virtue of the fact that the adjusting cams for the cylinder shut-off in the shut-off section in the cam circle are without action on the transmission devices of the three cylinders to be shut off. The result is that the transmission devices do not bring about opening of the inlet valves of the three cylinders to be shut off if they are loaded by way of the cams of the camshaft.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
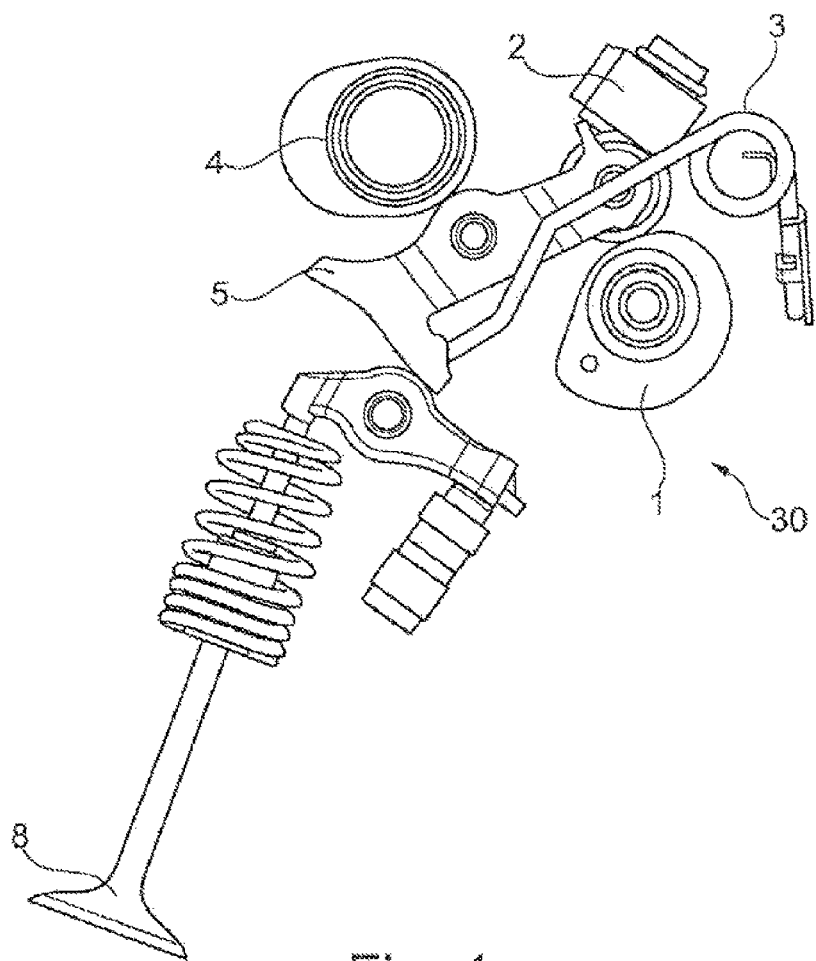
FIG. 1 is a schematic diagram of elements of the camshaft adjusting unit.

By way of example, FIG. 1 diagrammatically shows the elements of the camshaft adjusting unit 30 which acts in an opening and closing manner on an inlet valve 8. A transmission device 5, which is configured as an intermediate lever and on which the cams of the camshaft 4 act, is provided between a slotted guide 2 and the inlet valve 8. The inlet valve 8 opens or closes when the cam of the camshaft 4 acts on the transmission device 5, in a manner which is dependent on the position of the transmission device 5 with respect to the camshaft 4. The position of the transmission device can be set individually for each inlet valve 8 via the control shaft 1 and adjusting cams which are arranged thereon (as shown). A restoring spring 3 prestresses the transmission device 5 and moves it, in the state in which it is unloaded by adjusting cams of the control shaft 1, into a starting position, in which the cams of the camshaft 4 cannot bring about opening of the inlet valve 8. Depending on the rotational position of the control shaft 1, the transmission device 5 is pressed to a greater or lesser extent in the direction of the camshaft 4, and the action of the cams of the camshaft 4 is boosted or reduced.

Figure 2:
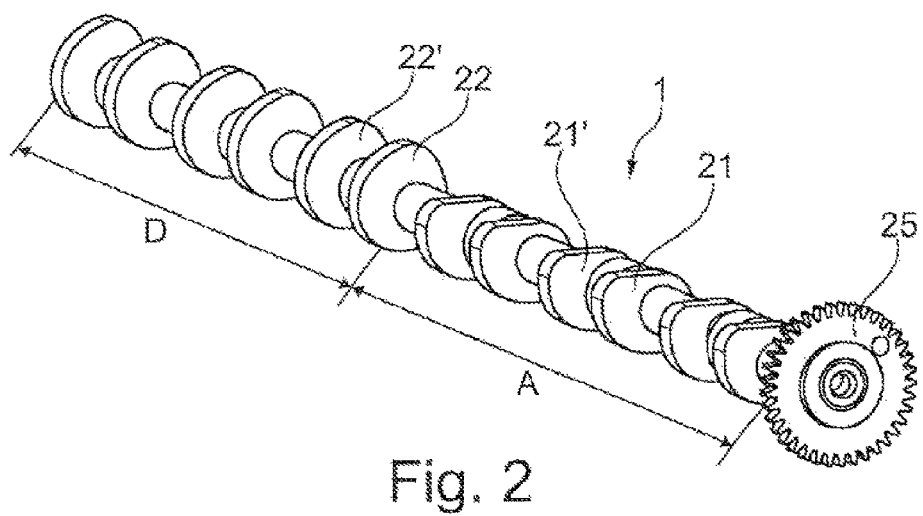
FIG. 2 is a perspective illustration of the control shaft.

FIG. 2 shows the control shaft 1 in a perspective view with region D for the continuous cylinder operation and region A for the inlet valve or cylinder shut-off. An adjusting gear 25 is fastened to the axial end of the control shaft 1, on which adjusting gear 25 the actuating motor can engage and can make the rotation possible.

The control shaft 1 is configured for a straight six cylinder internal combustion engine and has two adjusting cams for each cylinder. Here, in each case two identically shaped adjusting cams 22, 22' for the continuous cylinder operation are configured per cylinder in the region D for the continuous cylinder operation, and in each case two identically shaped adjusting cams 21, 21' for the cylinder shut-off are configured in the region A for the inlet valve or cylinder shut-off.

Figure 3:
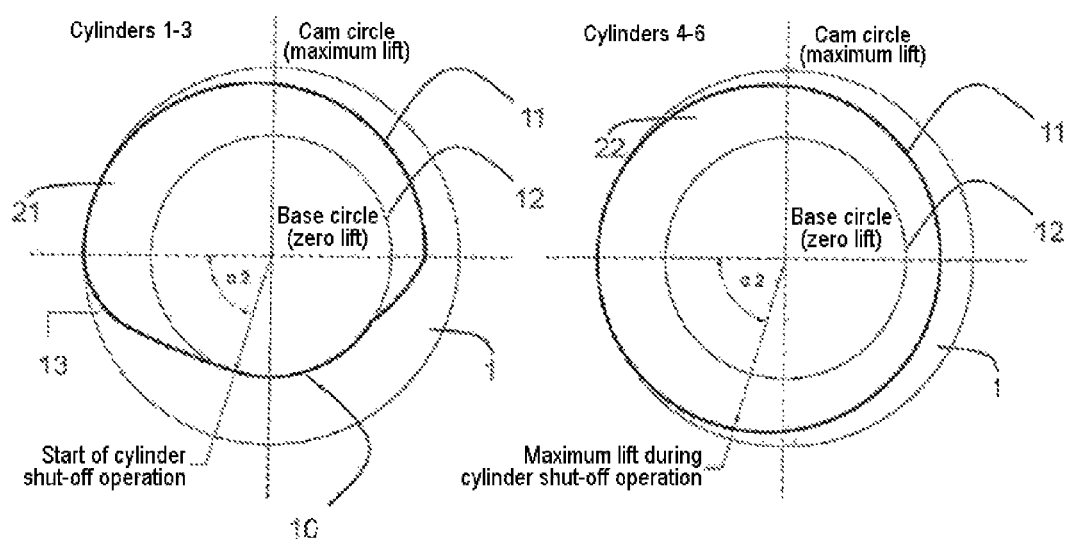
FIG. 3 are axial cross-sectional views of the different adjusting cams on the control shaft.

FIG. 3 shows axial sectional views of the adjusting cams 21 and 22 on the control shaft 1 of a straight six cylinder internal combustion engine. The left-hand view relates to the cylinders 1-3 which can be shut off via the adjusting cams for the cylinder shut-off 21 (region A), and the right-hand view relates to the cylinders 4-6 which are provided for continuous operation (region D). The adjusting cams for the continuous cylinder operation 22, 22' have a radial extent over their entire circumference of the cam circle, which radial extent is consistently greater than a zero lift extent along the base circle 12. The adjusting cams for the cylinder shut-off 21, 21' comprise, in the circumferential direction, the shut-off section 10 with a radial extent which is equal to the zero lift extent. The cam shape is distinguished in each case by way of the cam contour 11. The adjusting cams for the cylinder shut-off 21, 21' remain without effect in the shut-off section 10 on the transmission device 5 which is configured as a lever, and the inlet valves 8 remain closed. The start of the cylinder shut-off (ZAS) in the case of the adjusting cam for the cylinder shut-off 21, and the maximum stroke of the adjusting cam for the continuous cylinder operation 22 during the cylinder shut-off are likewise indicated, in each case at an angle $\alpha 2$. In the section 13, the torque which acts on the actuating motor by way of the adjusting cams for the cylinder shut-off 21 is at its greatest. By way of a corresponding shape of the adjusting cams for the continuous cylinder operation 22 in the corresponding region, the maximum lift is not utilized completely or is reduced, and the torque curve is therefore straightened. The embodiment which is shown relates to a rotational adjusting range in the circumferential direction of 360°. Said adjusting range can be reduced in both directions by in each case 15°, that is to say overall by 30°, by way of the provision of a stop.

The implementation of the invention is not restricted to the preferred exemplary embodiments which are specified above. Rather, a number of variants are conceivable which make use of the depicted solution, even in the case of embodiments of fundamentally different type. For example, the transmission devices can act directly on the inlet valve.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control shaft of a camshaft adjusting unit for an internal combustion engine, comprising:
   adjusting cams which are spaced apart axially and are configured in a first axial section of the control shaft for continuous cylinder operation and in a second axial section for a cylinder shut-off, wherein
   the adjusting cams have a radial extent which is greater than a zero lift extent over their entire circumference of the cam circle for permanent cylinder operation,
   the adjusting cams have a shut-off section of the cam circle with a radial extent which is smaller than or equal to the zero lift extent in the circumferential direction for the cylinder shut-off, and
   the control shaft has a stop which limits rotation in both circumferential directions and serves as a calibration point for an engine electronics system.

2. The control shaft as claimed in claim 1, wherein the stop is integrated into a bearing system of the control shaft.

3. The control shaft as claimed in claim 1, wherein the control shaft has a rotational adjusting range in the circumferential direction of 330°.

4. The control shaft as claimed in claim 1, wherein the adjusting cams have a radial extent which is continuously greater than a zero lift extent over 180° in the circumferential direction for the cylinder shut-off, and have a radial extent which is continuously smaller than or equal to the zero lift extent over 180° in the circumferential direction.

5. The control shaft as claimed in claim 4, wherein the adjusting cams have a radial extent which is smaller than a maximum lift extent for the continuous cylinder operation in a section of the cam circle, which section corresponds to the shut-off section of the adjusting cams for the cylinder shut-off.

6. The control shaft as claimed in claim 1, wherein the adjusting cams have a radial extent which is smaller than a maximum lift extent for the continuous cylinder operation in a section of the cam circle, which section corresponds to the shut-off section of the adjusting cams for the cylinder shut-off.

7. The control shaft as claimed in claim 1, wherein the control shaft is settable by way of rotation into at least two operating positions,
   a first operating position ensures a continuous cylinder operation in the case of all adjusting cams, and
   a second operating position ensures a partial cylinder shut-off at the adjusting cams for the cylinder shut-off and continuous cylinder operation in the case of the adjusting cams for the continuous cylinder operation.

8. The control shaft as claimed in claim 5, wherein the control shaft is settable by way of rotation into at least two operating positions,
   a first operating position ensures a continuous cylinder operation in the case of all adjusting cams, and
   a second operating position ensures a partial cylinder shut-off at the adjusting cams for the cylinder shut-off and continuous cylinder operation in the case of the adjusting cams for the continuous cylinder operation.

9. The control shaft as claimed in claim 1, wherein in each case two adjusting cams are provided per cylinder of the internal combustion engine.

10. A camshaft adjusting unit for an internal combustion engine, comprising:
    a camshaft with a plurality of cams which are spaced apart axially;
    a plurality of transmission devices which are configured to transmit a camshaft rotation and action of the cams into a translational movement on engine inlet valves associated with the transmission devices in order to open and close said engine inlet valves;
    a control shaft as claimed in claim 1, wherein positions of the transmission devices and therefore their action on the inlet valves are adaptable by way of the control shaft by the adjusting cams of said control shaft acting on, in each case one, transmission device, wherein
    the adjusting cams for the cylinder shut-off being without action on the transmission devices in the shut-off section of the cam circle, whereby said transmission devices do not bring about opening of the inlet valves in the case of being loaded by way of the cams of the camshaft; and
    the control shaft has a stop which limits the rotation in both circumferential directions and serves as a calibration point for an engine electronics system.

11. A method for shutting off inlet valves in an internal combustion engine using a camshaft adjusting unit as claimed in claim 8, the method comprising the steps of:

adapting positions of the transmission devices and therefore their action on the inlet valves by virtue of having their adjusting cams act on, in each case, one transmission devices, wherein the adjusting cams for the cylinder shut-off are without action on the transmission devices in the shut-off section in the cam circle, whereby said transmission devices do not bring about opening of the inlet valves in the case of being loaded by way of the cams of the camshaft.

12. A straight six cylinder internal combustion engine having a camshaft adjusting unit as claimed in claim 8, wherein three of the six cylinders can be shut off by virtue of the fact that the adjusting cams for the cylinder shut-off are without action on the transmission devices of the three cylinders to be shut off in the shut-off section in the cam circle, whereby the transmission devices do not bring about opening of the inlet valves of the three cylinders to be shut off in the case of being loaded by way of the cams of the camshaft, and the control shaft has a stop which limits the rotation in both circumferential directions and serves as a calibration point for an engine electronics system.

* * * * *